United States Patent

[11] 3,588,224

[72] Inventor Dalton Harold Pritchard
Princeton, N.J.

[21] Appl. No. 829,988
[22] Filed June 3, 1969
[45] Patented June 28, 1971
[73] Assignee RCA Corporation

[54] ADJUSTABLE BANDWIDTH OPTICAL FILTER

9 Claims, 5 Drawing Figs.

[52] U.S. Cl. .......... 350/157, 178/5.4BD, 178/5.4ST, 350/158
[51] Int. Cl. .......... H04n 9/06
[50] Field of Search .......... 350/147, 150, 157, 158; 178/5.4 (BD), 5.4 (ST)

[56] References Cited

UNITED STATES PATENTS

| | | | |
|---|---|---|---|
| 2,493,200 | 1/1950 | Land | 350/157X |
| 2,607,272 | 8/1952 | Bond | 350/157 |
| 3,399,591 | 9/1968 | Drougard et al. | 350/157X |
| 3,438,692 | 4/1969 | Tabor | 350/157 |

OTHER REFERENCES

Habegger, " Astigmatic Aberration Correction" IBM Tech Disclosure Bull. Vol. 11, No. 12 (May, 1969) p. 1776.

Evans, " The Birefringent Filter" J.O.S.A. Vol. 39, No. 3 (March, 1949) pp. 229— 242.

*Primary Examiner*—David Schonberg
*Assistant Examiner*—Paul R. Miller
*Attorney*—Eugene N. Whitacre

ABSTRACT: The optical apparatus used in a television system, for example, includes a series arrangement of three birefringent elements of different thickness interspersed with two quarter wave delay elements to constitute an optical filter. The filter is placed in the light path between an object and the image formed at the photosensitive element of a camera tube. The spatial frequency bandwidth of the light passing through the filter is controllable in one or more directions and in the same or different amounts in a plurality of different directions by suitable dimensioning of the birefringent elements and/or by appropriate rotational positioning of the entire filter about the optical axis.

INVENTOR.
Dalton Harold Pritchard
BY
Eugene M. Whitacre
ATTORNEY

INVENTOR.
Dalton Harold Pritchard
BY
Eugene M. Whitacre
ATTORNEY

ADJUSTABLE BANDWIDTH OPTICAL FILTER

BACKGROUND OF THE INVENTION

This invention relates to apparatus for limiting the spatial frequency bandwidth of light in the optical path of an image recording system.

There has long been a need for apparatus by which to vary the resolution of an optical image in a controlled manner and only in one or in several selected directions. One field in which such apparatus is particularly useful is that of television, especially in color television systems employing color signal encoding and decoding tubes provided with color selective strip filters. Representative examples of such systems include U.S. Pat. No. 2,733,291 granted to R. D. Kell, Jan. 31, 1956 and U.S. Pat. No. 3,378,633 granted to A. Macovski, Apr. 16, 1968. In such systems the luminance representative signal must have the full required resolution in order to reproduce a picture having satisfactory detail. The chrominance representative signal, however, may have reduced resolution relative to that of the luminance signal in the horizontal direction as in the NTSC system. Furthermore, the chrominance signal resolution must be reduced sufficiently to obviate the development of objectionable beat (sum and difference) frequencies between the luminance signal components and the chrominance signal components resulting from the repetition rate of the color selecting strips of the color encoding filter that occur in the optical portion of the system. One way in which the above described beat frequencies may be eliminated is by optically defocusing the optical image formed at the target electrode of the camera tube. Such an expedient, however, is undesirable because it would reduce the luminance resolution and would complicate the optical apparatus in a system in which both the luminance and chrominance images are derived from a common source.

It is known that a grating comprising alternate transparent and opaque strips may be placed in an optical path to limit the spatial frequency bandwidth associated with the color selective strip filters. However, such an arrangement can limit the spatial frequency bandwidth in only one direction and the light transmission efficiency is reduced because the opaque strips do not pass light. As used herein the term "spatial frequency bandwidth" is defined as the resolution equivalent frequency and is not intended to refer to the light wavelength equivalent frequency.

The term "quarter wave delay element" as used herein refers to a commercial quality optical plate for delaying visible light an amount substantially equal to a quarter wavelength of the light.

It is also known in the art that a cylindrical lens may be used to limit the spatial frequency bandwidth. Such a lens has a higher light transmission efficiency than the grating structure described above but a cylindrical lens also can only limit the spatial frequency bandwidth in one direction. Further, a cylindrical lens cannot reduce the transmission to zero at a selected frequency.

An object of the present invention is to provide a novel and relatively simple optical filter which is controllable in spatial frequency bandwidth and is otherwise sufficiently versatile to be adaptable to a wide variety of different applications.

In accordance with the invention an optical filter comprises a series arrangement of at least two birefringent elements having respectively different thicknesses and interspersed with a quarter wave delay element.

For a more specific disclosure of the invention, reference may be had to the following detailed description of such apparatus as used in a television signal generating system which is given in conjunction with the accompanying drawings, in which.

DESCRIPTION OF THE INVENTION

Figure 1:
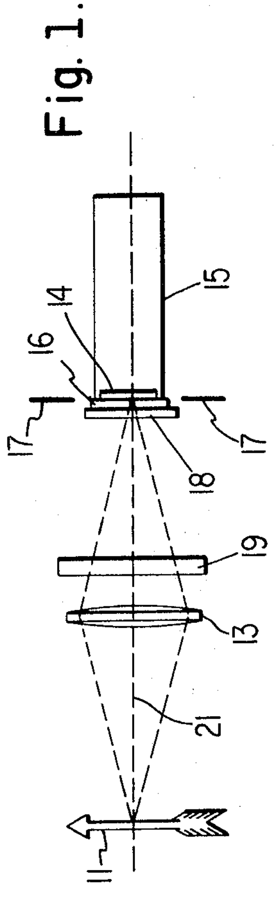
FIG. 1 is a diagrammatic representation of optical apparatus of a television camera system.

In FIG. 1, light representative of a television object 11 is projected by an optical system including a lens 13 onto the photosensitive electrode 14 of a camera tube 15, the electrode 14 being located internally of the tube adjacent its faceplate 16 in a focal plane 17. In this particular embodiment, the camera tube 15 is provided with a color encoding filter 18 which is mounted adjacent the faceplate 16 externally of the tube 15. Such an arrangement, including the color encoding filter 18, may be similar to that disclosed in the previously identified Macovski Patent 3,378,633 although it is to be understood that the adjustable bandwidth optical filter of the present invention is not necessarily limited for use in such a system. The optical system of FIG. 1 also includes an adjustable spatial frequency bandwidth filter 19. While the optical filter 19 may be placed at various locations in the light path, there are some advantages in locating it at other than an image plane, such as between the lens 13 and the color encoding filter 18. One such advantage is that any small imperfections which may be present in one or more of the elements of the optical filter 19 do not degrade the light image projected onto the electrode 14 since the filter 19 is not in an image plane. The camera tube 15 and all of the components of the optical system are symmetrically located relative to a central optical axis 21.

In general, each light ray component of an image entering a properly oriented one of the birefrigent elements is split within the element into an "ordinary" ray component and an angularly displaced "extraordinary" ray component. The angular displacement of the two ray components depends upon the particular material of the birefringent element. The two ray components emerge from the birefringent element parallel to one another and to the entering ray, the distance separating the emerging ray components being dependent upon the thickness of the birefringent element and the two different indices of refraction of the birefringent material. The emerging ray components are linearly polarized perpendicularly to one another so that by passing them through a properly oriented quarter wave delay element two resultant circularly polarized rays are produced, each of which has components at 90° relative to one another. Thus, there are created two spaced light rays, similar to the original light ray, which when passed through a second birefringent element oriented in the same manner as the first birefringent element but of a different thickness, produce four spaced emerging ray components. This process of passing light rays through combinations of birefringent elements of different thicknesses and quarter wave delay elements may be repeated as many times as desired, each repetition resulting in a greater attenuation of the image resolution equivalent frequencies beyond the desired limit frequency.

Figure 2:
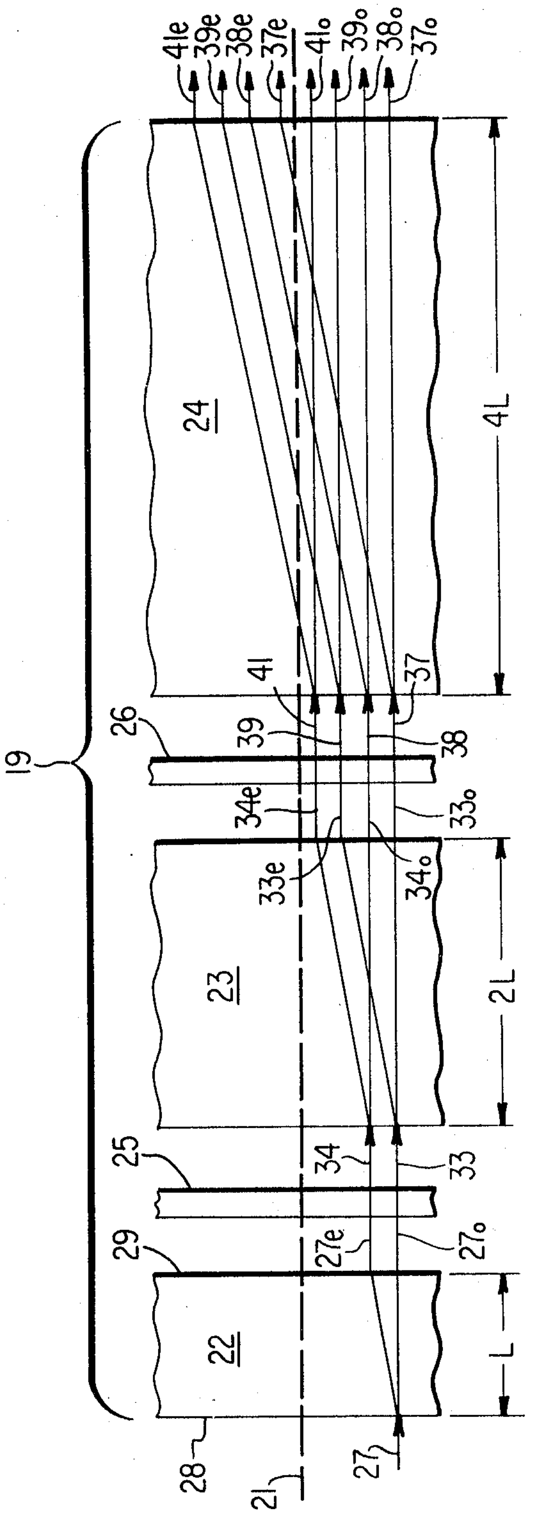
FIG. 2 is an exploded view, to a grossly enlarged scale, of a small section of a representative form of an adjustable optical filter of the invention; and, FIGS. 3A, 3B and 3C are curves illustrating one typical operating mode of the form of the invention shown in FIG. 2.

In the exploded view of FIG. 2 the adjustable bandwidth optical filter 19 has a configuration which has been successfully used in a television camera system of the type shown in FIG. 1. Filter 19 comprises three birefringent elements 22, 23 and 24, each of a different thickness, interspersed with quarter wave delay elements 25 and 26. In a practical form, all of these elements 22—26 preferably are cemented together with a suitable refractive index-matching cement to form not only a single unitary structure, but also one in which surface reflection losses from the plurality of components is minimized. In the presently preferred form of the invention the birefringent elements 22, 23 and 24 of FIG. 2 are of a crystalline material commonly known as calcite, the elements 22—24 being oriented relative to incident nonpolarized light rays to effect a splitting of each ray into "ordinary" and "extraordinary" ray components separated from one another in a direction parallel to the horizontaL axis of the image. The splitting angle within the calcite material of the ray components is about 6° and the two ray components emerge from the calcite birefringent element spaced from one another by a distance determined by the 6° splitting angle and the thickness of the element, each exit ray component following a path which is parallel to that of the original light ray as it entered the calcite birefringent element.

The quarter wave delay elements 25 and 26 are readily available optical plates which delay visible light an amount substantially equal to a quarter wavelength of the light. The plates may be of mica or some suitable plastic material.

In order to demonstrate the manner in which the adjustable bandwidth optical filter of the invention functions to achieve a desired result, a single light ray 27 entering the front face 28 of the calcite birefringent element 22 of FIG. 2 will be considered. In order to facilitate an understanding of the operation of the system, the ray 27 is shown entering the element 22 normal to its front face 28. It will be understood, however, that the light ray 27 is typical of all light rays entering the birefringent element 22 from any angle. Within the element 22 the ray 27 is split into two components bearing about a 6° relationship to one another which emerge from the rear face 29 of the element 22 as an ordinary ray component 27*o* and an extraordinary ray component 27*e*, parallel to one another and to the entering ray 27. The horizontal spacing between, or mutual displacement of, the emerging ray components 27*o* and 27*e* is a function of the approximate 6° splitting angle and the thickness L of the birefringent element 22. Also, the emerging ray components 27*o* and 27*e* are linearly polarized orthogonally to one another.

Figure 3A:
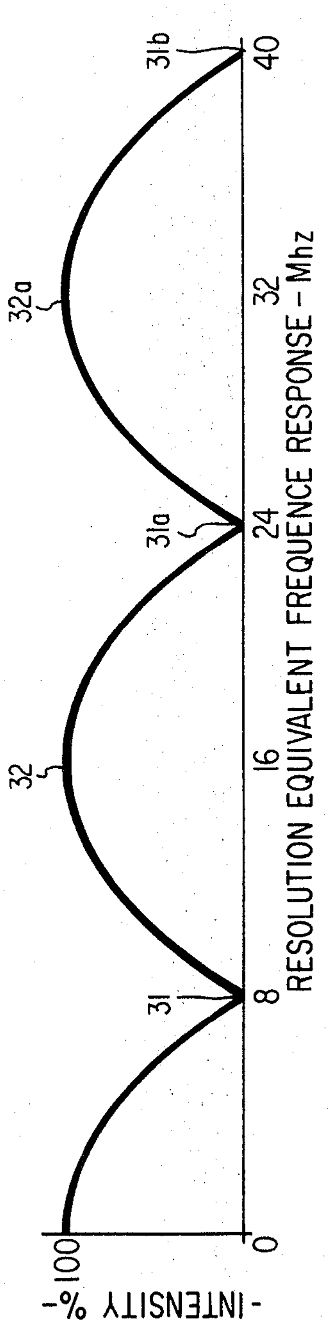

The explanation of the operation of the filter 19 will be given with reference to FIGS. 3A, 3B and 3C and by tracing a single typical light ray 27 through successive ones of the birefringent elements 22, 23 and 24 and the quarter wave elements 25 and 26. FIG. 3A illustrates, in a spatial frequency domain, the transmission versus image resolution equivalent frequency characteristic of the splitting operation performed on the typical light ray 27 by the birefringent element 22 shown in, and described with reference to, FIG. 2. It will be assumed that the function of the complete filter 19 is to effectively limit the horizontal resolution of the system to a maximum frequency of 2 MHz., for example, so that such a filter could be used in a color television camera system such as that disclosed in the Macovski Patent 3,378,633. It is seen in FIG. 3A that the resolution equivalent frequency characteristic of the single birefringent element 22 has a first zero response or null point 31 at a cutoff frequency of 8 MHz. and other zero response points 31*a*, 31*b*, etc., at odd multiples of that cutoff frequency. Also, the curve of FIG. 3A indicates that the resolution equivalent frequency characteristic of the single birefringent element has substantially full or 100 percent response points 32, 32*a*, etc., at even multiples of the 8 MHz. cutoff frequency. As previously indicated, the thickness L of the birefringent element 22 determines the mutual displacement of the emerging ordinary and extraordinary ray components 27*o* and 27*e* of FIG. 2 for a given splitting angle such as 6°, for example. Thus, in the spatial frequency domain, the thickness L of the element 22 determines the resolution equivalent frequency at which the first zero response point 31 occurs and also the resolution equivalent frequency separations between the zero response points 31, 31*a*, 31*b*, etc. For the purpose of explaining the illustrative embodiment of the invention shown in FIG. 2 it is assumed that the thickness L of the birefringent element 22 is such as to produce the resolution equivalent frequency characteristic of FIG. 3A.

It should be pointed out that even if the birefringent element 22 of FIG. 2 were to have sufficient thickness to produce such a separation between the emerging ray components 27*o* and 27*e* as to have a first resolution equivalent frequency zero response point at the assumed desired resolution limit of 2 MHz, it would also have peak response points equal in amplitude to the substantially 100 percent response points 32, 32*a*, etc., of FIG. 3A occurring at even harmonics of 2 MHz., such as 4 MHz. and 8 MHz. Television camera tubes commonly in commercial use have resolution capabilities at least up to 4 MHz. and in many cases as high as 8 MHz. Hence, a single birefringent element cannot adequately attenuate the resolution equivalent frequency of light to a desired point below the resolution capabilities of a television camera tube because a single element introduces null points at specific related frequencies only.

Accordingly, in the apparatus embodying the invention, the two orthogonal, linearly polarized light ray components 27*o* and 27*e* are passed through the quarter wave delay element 25 which is oriented relative to the optical axis 21 so that each ray component is circularly polarized to produce two rays 33 and 34, each of which has components at 90° to one another. Quarter wave element 25 is rotated such that the rays 33 and 34 are of equal intensity. If desired, the quarter wave plate 25 may be rotated such that the relative intensities are unequal. Each of the circularly polarized rays 33 and 34 is passed through the second calcite birefringent element 23 which splits each ray into ordinary and extraordinary components 33*o*—33 and 34*o*—34*e*. These ray components diverge from one another by about 6° as in the previously described case of the element 22. As indicated, the thickness of the birefringent element 23 is 2L which is twice the thickness L of the element 22, although, as will be explained later, the invention is not necessarily limited to such a relationship. Because the spacing between the ordinary o extraordinary components of a light ray entering the birefringent element 23 is a function, not only of the 6° splitting angle, but also of the thickness of the element, the spacing of the emergent ray components 33*o*—33*e* and 34*o*—34*e* is double that of the ray components 27*o*—27*e* emerging from the element 22. Thus, the ray components 33*o*, 34*o*, 33*e* and 34*e* are mutually spaced at substantially the spacing of the ray components 270 and 27*e*. Also, as in the case of the light ray components 27*o*—27*e* emerging from the birefringent element 22, the ray components 33*o*—33*e* and 34*o*—34 are linearly polarized orthogonally to one another.

Figure 3B:
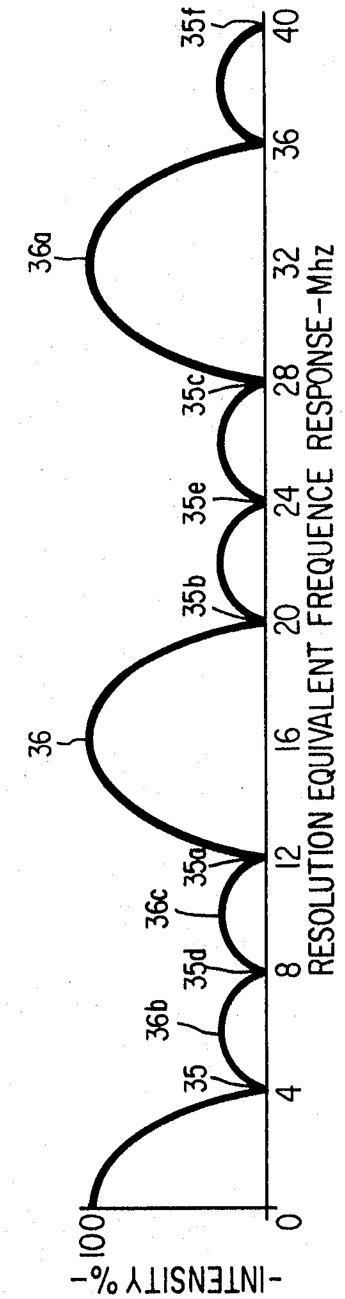

FIG. 3B illustrates, in a frequency domain, the resolution equivalent frequency characteristic of the operation performed on the typical light ray 27 by the combined action of the two birefringent elements 22 and 23 and the quarter wave delay element 25. The curve of FIG. 3B indicates that the filter has a first major zero response point 35 at a resolution equivalent frequency of 4 MHz. for the horizontal resolution of the signal, and other major zero response points 35*a*, 35*b*, 35*c*, etc., at odd multiples of the 4 MHz. resolution equivalent frequency. In addition, such a two element filter has still other minor zero response points 35*d*, 35*e*, 35*f*, etc., resulting from the combined action of the two birefringent elements 22 and 23 of FIG. 2 and which correspond to the zero response points 31, 31*a*, 31*b*, etc., of the curve of FIG. 3A representing the resolution equivalent frequency of the single element 22 of FIG. 2. The curve of FIG. 3B also indicates that the two element filter characteristic has major peak response points 36, 36*a*, etc., at certain even multiples of the 4 MHz. resolution equivalent frequency. The separation of the major peak response points is determined by the thinnest piece of calcite used. In addition, such a two element filter has minor peak response points 36*b*, 36*c*, etc., produced by the combined action of the two birefringent elements 22 and 23 of FIG. 2.

Even though the curve of FIG. 3B indicates that a two element filter materially reduces the resolution equivalent frequency response in the range between 4 MHz. and 12 MHz., such a filter may effect insufficient response reduction for the resolution equivalent frequencies below 4 MHz. to be useful for the assumed television camera purposes. In this case, however, it is to be noted that only the major peak response points 36 and 36*a* have substantially full or 100 percent amplitude and that the minor peak response points 36*b* and 36*c* are of materially reduced amplitude. Such amplitude, nevertheless, may be sufficient to produce undesired video signals by a television camera having a resolution capability up to at least 6 MHz. and even 8 MHz. Thus, while an optical filter having only two birefringent elements interspersed by a quarter wave delay element effects a substantial improvement in the resolution equivalent frequency limitation of light waves which may be adequate for some uses of such an embodiment of the invention, still further improvement may be desired for the assumed television camera system and this can be achieved by the addition of at least a third birefringent element to the apparatus.

Accordingly, the four orthogonal, linearly polarized ray components 33*o*, 34*o*, 33*e* and 34*e* of FIG. 2 which emerge from the birefringent element 23 are passed through the second quarter wave delay element 26 which is angularly oriented relative to the optical axis 21 so that four circularly polarized rays 37, 38, 39 and 41 are produced which impinge normally upon the third birefringent element 24. Delay element 26 is oriented such that rays 37, 38, 39 and 41 are of equal intensity. Element 24 also is angularly oriented relative to the optical axis 21 so that each of the impinging rays is split into an ordinary and an extraordinary component at about a 6° angle. The element 24 is shown as having a thickness 4L which is double that of the element 23 and quadruple that of the element 22. Consequently, eight ray components 37*0*, 38*0*, 39*o*, 41*o*, 37*e*, 38*e*, 39*3*and 41*e* emerge from the birefringent element 24 with equal spacing.

Figure 3C:
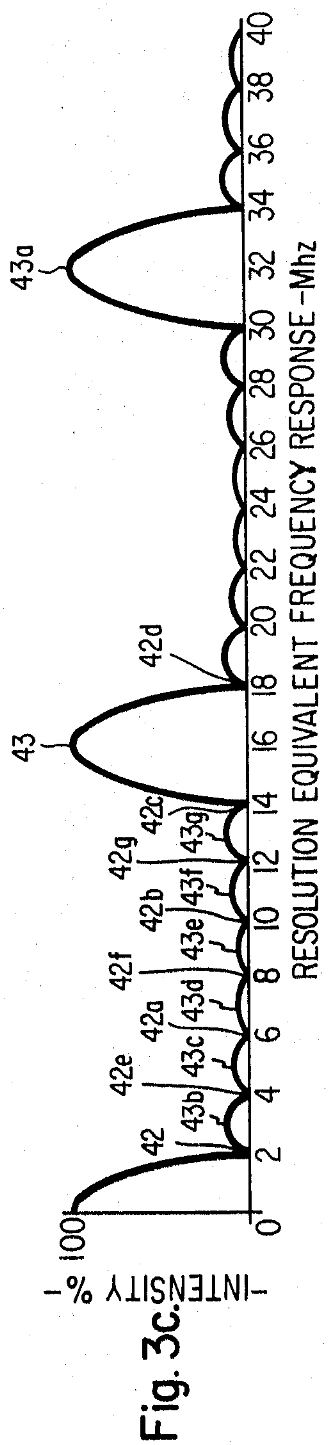

FIG. 3C illustrates, in a spatial frequency domain, the resolution equivalent frequency characteristic of the operation performed on the typical light ray 27 by the combined action of the three birefringent elements 22, 23 and 24 and the two quarter wave delay elements 25 and 26. The curve of FIG. 3C shows that the complete optical filter 19 of FIG. 2 has a first major zero response point 42 at 2 MHz. which is the desired limiting resolution equivalent frequency for the horizontal resolution of the chrominance signal assumed for the purpose of this explanation. The curve has additional major zero response points 42*a*, 42*b*, 42*c*, 42*d*, etc. at odd multiples of the 2 MHz. limiting resolution equivalent frequency. Also, the curve indicates that 49 the three element filter produces additional minor zero response points 42*e*, 42*f*, 42*g*, etc. resulting from the combined action of all three birefringent elements 22, 23 and 24 of FIG. 2. This curve further illustrates that the characteristic of the three element filter 19 of FIG. 2 has major peak response points 43, 43*a*, etc., at certain even multiples of the assumed resolution limit frequency of 2 MHz. This filter characteristic curve also has minor peak response points 43*b*, 43*c*, 43*d*, 43*e*, 43*f*, 43*g*, etc. the amplitudes of which, however, are so small as to have no significant effect upon a television camera tube and, hence, do not produce any undesirable video signals. As may be seen from the curve of FIG. 3C, the three element filter 19 of FIG. 2 does not produce a response of any appreciable amplitude until the occurrence of the substantially 100 per cent response peak 43 at 16 MHz. the eighth harmonic of the desired 2 MHz. limit frequency. Any light at such a filter resolution equivalent frequency is not detrimental to the operation of a television camera system because such a frequency is considerably beyond the resolution capabilities of any camera tubes now in commercial use.

It is to be noted that the first major zero response point which occurs at the lowest resolution equivalent frequency is determined by the birefringent element of the filter 19 of FIG. 2 having the greatest thickness. Thus, with reference to the curve of FIG. 3C the occurrence of the first major zero response point 42 at the resolution equivalent frequency of 2 MHz. is produced by the 4L thickness of the element 24 of FIG. 2. Also, the first major peak response point 43 occurs at a resolution equivalent frequency determined by the birefringent element having the least thickness. The curves of FIGS. 3A, 3B, and 3C show that the respective first major peak response points 32, 36 and 43 occurring at 16 MHz. are produced by the element 22 of FIG. 2 having the thickness L. It should also be understood that, in FIG. 3B, were it not for the combined action of the two filter elements 22 and 23 of FIG. 2, the curve would have a substantially 100 percent amplitude peak response point at 8 MHz. and another one at 24 MHz. Similarly, in FIG. 3C, the combined action of the three filter elements 22, 23 and 24 prevents this curve from having substantially 100 percent amplitude peak response points at 4 MHz., 8 MHz. and 12 MHz.

In view of the described roles played by the birefringent elements of different thicknesses the practical design of such a filter begins with the selection of the element having the greatest thickness, this dimension being determined by such factors as the desired effective cutoff resolution equivalent frequency and the size of the optical image to be produced. As an example, in a television camera system utilizing a relay optical system and a color encoding filter having a width of approximately 3 inches, the birefringent element 24 of FIG. 2 should have a thickness of about one-tenth inch in order to produce an effective cutoff resolution equivalent frequency of 2 MHz. In accordance with the assumed relationship of the other birefringent filter elements, the thickness of the element 23 would be about 1/20 inch and that of the element 22 would be about 1/40 inch.

The foregoing description of the operation of a particular form of the invention has been predicated on a desired limitation of the optical resolution in only one direction, for example, the horizontal direction in a specific color television system. The invention, however, is not so limited. Resolution may be restricted by the described apparatus equally in both of any two orthogonal directions, such as horizontal and vertical directions, for example, by rotating the entire filter 19 about the optical axis 21 of FIG. 1 through an angle of 45° from that described. The relationship between the amount of such horizontal and vertical resolution limitation may be controlled by suitable adjustment of the angle of rotation about the optical axis 21 over the entire gamut from a predetermined limitation in the horizontal direction and no limitation in the vertical direction, as in the described embodiment of the invention, to the full predetermined limitation in the vertical direction and none in the horizontal direction.

In the illustrative embodiment of the invention in which there is a 2-to-1 thickness relationship between successive ones of the birefringent elements 22, 23 and 24 of FIG. 1 there is a symmetrical relationship of the major and minor zero response points respectively to associated major and minor peak response points of the resolution equivalent frequency response curves as can be seen in FIGS. 3A, 3B and 3C. The present invention, however, is not so limited. By suitably varying the thickness relationship of the birefringent elements the zero-to-peak response relationship may be made unsymmetrical in substantially any desired manner. Such thickness variations of the elements produce unequal displacements of the light rays and the images represented thereby, thus enabling the creation of an optical filter having substantially any desired characteristic. It should also be understood that any optical filter embodying the principles of this invention may incorporate a greater or lesser number than the three birefringent elements 22, 23 and 24 of FIG. 1 and the two quarter wave delay elements 25 and 26 disclosed herein so long as at least two birefringent elements and one delay element are used.

Another feature of the invention by which its characteristic may be further controlled is that the quarter wave delay elements, such as one or both the elements 25 and 26 of FIG. 2, may be angularly oriented relative to the optical axis 21 so that the circularly polarized ray components produced thereby have different intensities and, thus, the individual images represented by such rays have different relative intensities.

The light transmission through an optical filter of the type described is good because the absorption loss in the visible light range is very low in suitable materials such as calcite, and surface reflection losses are minimized by cementing the birefringent elements 22, 23 and 24 and the quarter wave delay elements 25 and 26 together with cement which matches the refractive indices of these elements.

Two of the described filters may be placed in series and rotated at different angular relationships with respect to the image to produce a resultant continuously adjustable resolution frequency limitation with respect to any image axis.

Thus, the invention provides an optical filter having great versatility not heretofore attainable by any known device. By suitably proportioning the respective thicknesses of a plurality of birefringent elements interspersed with quarter wave delay elements there is provided a control of the filter cutoff characteristics in both the resolution equivalent frequency domain and in physical directions with respect to the original image. Such an optical filter is useful not only in a color television camera system such as that disclosed in the Macovski Patent 3,378,633 to reduce the signal horizontal resolution in order to minimize beats with a color encoding filter but also in other television system applications such as in kinescope recording apparatus to effectively eliminate the scanning lines, for example. Furthermore, such an optical filter is not limited for use in television systems but may be used generally in any optical system where its unique capabilities would be beneficial.

I claim:

1. In a color encoding system including a color encoding filter assembly disposed between an object and a photosensitive electrode for spatially separating brightness and color respresentative light imaged onto said photosensitive electrode, which electrode when scanned produces a baseband brightness signal and at least one color representative signal contained as sidebands of a carrier wave, an optical filter disposed between said object and said color encoding filter assembly for reducing the spatial frequency bandwidth of said brightness representative light for reducing the crosstalk between said brightness and color representative signals, comprising:

a pair of birefringent elements of mutually different thicknesses;

a delay element for delaying light substantially one quarter wave of the wavelength of said light interspersed between said birefringent elements; and said thicknesses being selected such that light components having a spatial frequency greater than the desired brightness signal bandwidth are substantially attenuated such as to minimize the crosstalk between said brightness and color representative signals.

2. A color encoding system as defined in claim 1, wherein said elements are cemented together to form an integral structure.

3. In a color encoding system for producing signals representative of the color and brightness of an object, the combination comprising:

an image pickup device having a photosensitive electrode;

a color encoding filter assembly disposed between said object and said photosensitive electrode for spatially separating brightness and colored light components of said object imaged onto said photosensitive electrode, which electrode when scanned yields signals representative of the color and brightness of said object;

an adjustable spatial frequency bandwidth optical filter disposed between said object and said color encoding filter assembly for restricting the spatial frequency bandwidth of said object light for reducing crosstalk between said color and brightness representative signals;

said optical filter comprising;

a plurality of birefringent elements of mutually different thicknesses;

delay elements equal in number to one less than the number of said plurality of birefringent elements for delaying light an amount equal to one quarter wavelength of said light; and said birefringent and quarter wave delay elements being arranged alternately in series along, and each being angularly oriented about, the axis of said optical system so as to effect a predetermined spatial frequency bandwidth limitation of the light passing through said filter.

4. A color encoding system as defined in claim 3, wherein:

the direction of said bandwidth limitation is controllable by said angular orientation of said birefringent elements about said optical system axis.

5. A color encoding system as defined in claim 4, wherein:

the extent of said bandwidth limitation is controllable by the number and respective thicknesses of said birefringent elements.

6. In a color encoding system for producing signals representative of the color and brightness of an object, the combination comprising:

an image pickup device having a photosensitive electrode;

a color encoding filter assembly disposed between said object and said photosensitive electrode for spatially separating brightness and colored light components of said object imaged onto said photosensitive electrode, which electrode when scanned yields signals representative of the color and brightness of said object;

an adjustable spatial frequency bandwidth optical filter disposed between said object and said color encoding filter assembly for restricting the spatial frequency bandwidth of said object light for reducing crosstalk between said color and brightness representative signals;

said optical filter comprising;

first and second birefringent elements having different thicknesses between their respective light entrance and exit faces and both similarly oriented angularly about the axis of said optical system to produce at each exit face a pair of two spaced light ray components derived from each nonpolarized light ray impinging upon each associated entrance face, said produced light ray components of each pair being linearly polarized orthogonally relative to one another and following paths parallel to that of the impinging light ray from which said ray components are derived; and a first delay element for delaying light an amount substantially equal to one quarter of its wavelength located between said first and second birefringent elements and angularly oriented about the axis of said optical system so as to circularly polarize each pair of said linearly polarized light ray components produced by said first birefringent element and to transmit said circularly polarized ray components to said second birefringent element.

7. A color encoding system as defined in claim 6, and additionally comprising:

a third birefringent element having a thickness between its entrance and exit faces different from that of said first and second birefringent elements and oriented angularly about the axis of said optical system similarly to that of said first and second birefringent elements to produce at its exit face a pair of two spaced light ray components derived from each nonpolarized light ray impinging upon its entrance face, said light ray components of each pair produced by said third birefringent element being linearly polarized orthogonally relative to one another and following paths parallel to those of the respective impinging light rays from which said ray components are derived; and a second quarter wave delay element located between said second and third birefringent elements and angularly oriented about the axis of said optical system so as to circularly polarize each pair of said linearly polarized light ray components produced by said second birefringent element and to transmit said circularly polarized ray components to said third birefringent element.

8. A color encoding system as defined in claim 7, wherein:

said birefringent and quarter wave delay elements are angularly oriented about said optical system axis to effect said bandwidth limitation in one direction.

9. A color encoding system as defined in claim 8, wherein:

the thickness of said second birefringent element is double that of said first birefringent element; and the thickness of said third birefringent element is double that of said second birefringent element.